Aug. 30, 1949.  E. L. ALLEN  2,480,688
DOOR CONTROL MECHANISM
Filed Aug. 20, 1947  5 Sheets-Sheet 1

INVENTOR.
EDWIN L. ALLEN
BY
*Bosworth + Sessions*
ATTORNEYS.

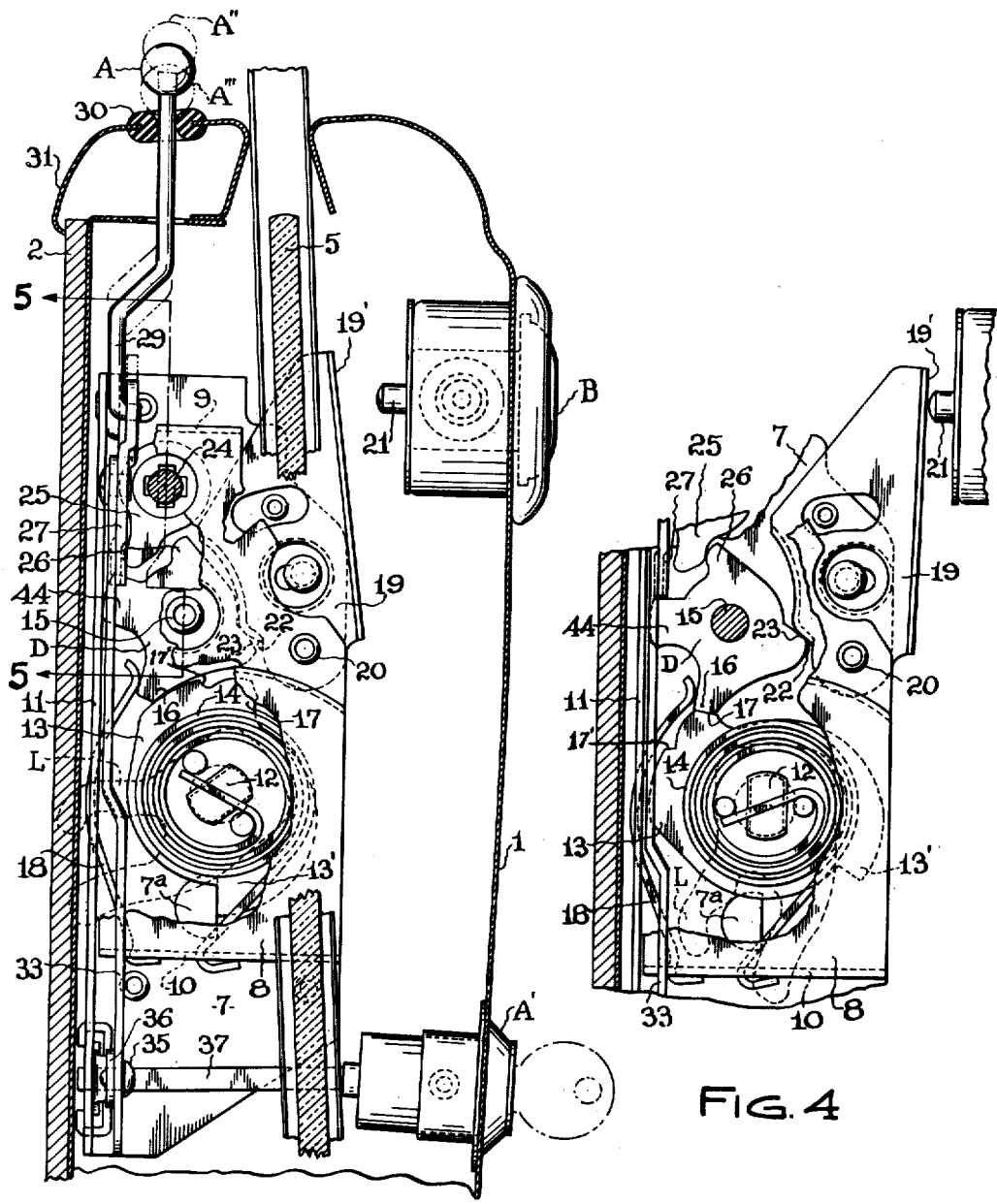

Aug. 30, 1949.                    E. L. ALLEN                    2,480,688
                             DOOR CONTROL MECHANISM
Filed Aug. 20, 1947                                          5 Sheets-Sheet 3

*INVENTOR.*
EDWIN L. ALLEN
BY
*ATTORNEYS.*

Aug. 30, 1949.　　　　　E. L. ALLEN　　　　　2,480,688
DOOR CONTROL MECHANISM
Filed Aug. 20, 1947　　　　　　　　　　　5 Sheets-Sheet 4

INVENTOR.
EDWIN L. ALLEN
BY
Bosworth & Sessions
ATTORNEYS.

Aug. 30, 1949.  E. L. ALLEN  2,480,688
DOOR CONTROL MECHANISM
Filed Aug. 20, 1947  5 Sheets-Sheet 5

INVENTOR.
EDWIN L. ALLEN
BY
ATTORNEYS

Patented Aug. 30, 1949

2,480,688

UNITED STATES PATENT OFFICE 2,480,688

DOOR CONTROL MECHANISM

Edwin L. Allen, Cleveland Heights, Ohio, assignor to Schonitzer Products Company, Cleveland, Ohio, a corporation of Ohio Application August 20, 1947, Serial No. 769,688

21 Claims. (Cl. 292—216)

This invention relates to door control mechanisms and more particularly to means for locking such mechanisms to prevent unauthorized opening of the door with which the mechanism is associated.

The Rudolph I. Schonitzer United States Patent Nos. 2,094,413 and 2,156,874, dated September 28, 1937 and May 2, 1939 respectively, disclose certain door control mechanisms. The present invention relates to improvements in the general class of door control apparatus which may be broadly described as having coacting elements associated with the door and door frame structures whereby the door may be latched and held in closed position or released from closed position to permit opening thereof, and as including detent means whereby one of the coacting elements, which may be termed the latch member, is releasably retained in operative or door latched position when the door is closed. When the detent means of this type door control mechanism is actuated by suitable means, such as a push button or handle device, to release the latch member and permit opening of the door, the latch member is moved into operated or door unlatched position concurrently with opening movement of the door. Where the term "push button" is used herein it is intended to include all types of door latch actuating or control devices such as handles, levers, etc., as well as push buttons proper.

It is frequently desirable to provide means for locking door control mechanisms to prevent unauthorized opening of the door with which the mechanism is associated. In the devices disclosed in the said Schonitzer patents this locking means comprises a restraining or locking member supported to be moved into and out of a restraining or locking position in which movement of the latch unit from operative or door latched position to operated or door unlatched position is prevented. The copending United States patent applications of Edwin L. Allen, Serial No. 746,521, filed May 7, 1947, and of Edwin L. Allen and Rudolph I. Schonitzer, Serial No. 760,074, filed July 10, 1947, disclose and claim certain door control mechanisms which include locking means for preventing movement of the latch unit when the door is closed and latched, thus preventing unauthorized entry. The disclosure of the present application has certain features in common with said copending applications which features are claimed therein and accordingly cross reference is made to said copending applications.

In some door latch installations, particularly those for the doors of automobiles or the like, it is desirable to provide means for locking and unlocking the door from inside the vehicle and also to provide means whereby the operator of the vehicle may, when the vehicle door is open, manually set the locking apparatus in a position such that, upon movement of the door into closed position with concurrent movement of the door control mechanism into door latched position, the locking apparatus will automatically become effective to prevent unauthorized opening of the door from outside of the vehicle. Accordingly, it is an object of the present invention to provide a self-acting locking means for a door control mechanism which, when the latch mechanism is in door unlatched position, may be preset by the vehicle operator in such a manner that when the door is closed the locking mechanism will automatically be moved into latch locked position.

Other objects of my invention include: the provision of locking means for door control mechanisms which, when the door is closed and latched, may be manually moved into and out of latch locked position and, when the door is open and unlatched, may not be moved into latch locked position but may be moved into an intermediate or preset position from which further movement into latch locked position is automatically effected upon closing the door; the provision of self-acting locking means for door control mechanisms which may be arranged to be controlled either solely by an inside actuating knob or lever or by both an inside actuating knob or lever and by an outside key controlled actuating means; the provision of self-acting locking means for door control mechanisms of the type described which is incorporated directly in the door control mechanism assembly; the provision of a self-acting lock for door control mechanisms which is fully automatic and requires no action on the part of the operator other than closing the door after he has moved the lock positioning means to place the locking member in a preset or intermediate position; the provision of an automatic self-acting lock which may readily be incorporated in door control mechanisms of the types disclosed in said Schonitzer patents and said copending United States patent applications with a minimum of additional structure and without substantially increasing the size or cost of the unit; and the provision of a simple, rugged, and effective self-acting lock for various types of door control mechanisms.

The above and other objects of my invention will appear from the following description of several embodiments thereof reference being had to the accompanying drawings in which:

Figure 3 is an enlarged vertical cross-sectional view taken substantially on line 3—3 of Figure 1 but differing from Figure 1 in that the latch unit is shown in operated or door unlatched position, the lock mechanism is shown in its preset or intermediate position, and the window glass has been lowered.

Figure 4 is a fragmentary view similar to Figure 3 but showing the latch unit and detent of my door control mechanism in their operative or door latched positions and showing the lock mechanism in latch locked position.

Although I have illustrated and described my invention herein as associated with the front door of an automotive vehicle having outside key controlled means for positioning the lock mechanism as well as inside manually operable means for performing this function, it will be understood by those skilled in the art that the outside key controlled means may be omitted for certain installations such as the rear doors of automobiles where outside key control of the lock is not desired. It will also be understood that my improved door control mechanism may readily be adapted for use with many different types of closure members which require latching and locking apparatus.

Figures 1, 2:
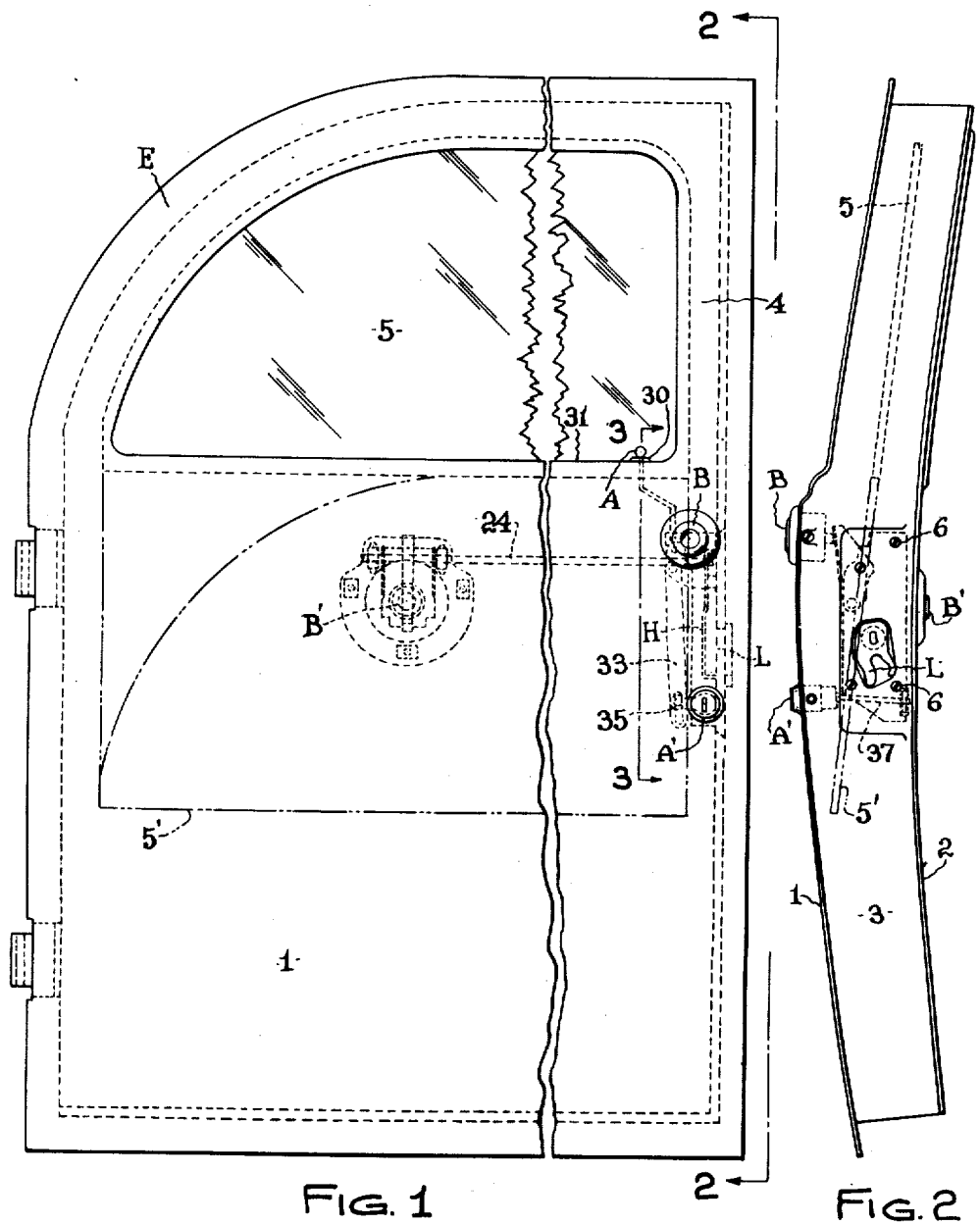
Figure 1 is an illustrative side elevation of the outside of a left-hand front automobile type door having my improved door control mechanism installed therein, the locking means being illustrated in latch locked position and the latch unit being illustrated in operative or door latched position.
Figure 2 is a rear or free edge view of the door and door control mechanism shown in Figure 1, taken substantially on line 2—2 of Figure 1.

Referring now to the drawings, the door E includes the usual outer panel 1 and inner panel 2 and is provided with a free edge wall portion 3 which closes the rear edge of the door structure and forms the outer wall of door lock pillar 4. The window glass 5, which is shown in raised position in Figure 1, is supported in any suitable manner and is provided with means (not shown) for lowering same into the position shown in Figure 3 and in dot and dash lines at 5' in Figure 1.

A door control mechanism having a frame structure or housing generally indicated at H is mounted on the inner face of the free edge wall 3 of the door as by screws 6. The movable latch member L is supported by the housing H adjacent the outer surface of free edge wall 3 for movement substantially parallel thereto. It will be understood that a suitable keeper pin or the like (not shown) is mounted on a suitable door frame (also not shown) and that the latch member L and keeper pin cooperate to effect latching of the door. An outside actuating member in the form of a push button assembly B is located on the outer panel 1 and an inner remote control actuating member in the form of a push button assembly B' is located on the inner panel 2. As seen in Figure 1 a manually operable lock actuating knob for positioning the locking member in its various positions is indicated at A and is shown in latch locked position. An outside key controlled actuating unit A' for positioning the locking member is mounted on the outer panel 1 below the push button B. The above brief description is given to assist in an understanding of the general arrangement of my apparatus in a typical automobile door and the elements so far described are substantially the same as shown and described in detail and claimed in said copending U. S. patent application of Edwin L. Allen, Serial No. 746,521, filed May 7, 1947. Only sufficient description of the elements which are common to this application and said copending application will be given herein for an understanding of the general arrangement and operation of the mechanism.

Referring now particularly to Figures 3 to 9 inclusive, the frame structure H includes a base plate 7, a cover plate 8 having end walls 9 and 10, and an edge wall or flange 11, preferably formed integrally with the base plate 7. The latch member L is secured to a shaft 12 rotatably mounted in a suitable bearing in the base plate 7. At the inner end of shaft 12 is secured a latch control element 13 which, together with latch member L and shaft 12 form what may be termed the "latch unit." It will be understood that where the term "latch unit" is used in this specification and in the appended claims it is intended to refer to and include the latch member proper of a door control mechanism together with the parts which are movable concurrently with the latch member proper and are employed for effecting and controlling its operation.

The latch member L as seen in Figure 3 is in its operated or door unlatched position. A spiral spring 14 is anchored at its lower end to the frame H and is operatively connected at its upper end to the latch control element 13. This spring exerts a force on the latch unit tending to urge same from its operative or door latched position as seen in Figure 4 into operated or door unlatched position as seen in Figure 3. Movement of latch member L in unlatching direction is limited by engagement of a lug 13' on control element 13 with a projection 7ª formed on base plate 7 (see Figure 3). As will be understood by those skilled in the art, when in door unlatched position (Figure 3) the latch member L may be freely moved away from the keeper member (not shown) on the door frame to permit opening of the door, such an arrangement being clearly illustrated and described in said above identified U. S. patents of Rudolph I. Schonitzer.

The detent D is pivotally supported on a pin 15 which extends between and is carried by the plates 7 and 8 of frame structure H. Abutment portion 16 of detent D is adapted to engage and coact with an abutment portion 17 on control element 13 to maintain the latch unit in door latched position as seen in Figure 4. A spring 18, carried by frame H, has its upper free end engaging the detent D and exerts a force thereon urging the detent toward its latch holding position (counterclockwise as seen in Figures 3 and 4) shown in Figure 4.

In order to move the detent D from its latch holding position as seen in Figure 4 into latch released position as seen in Figure 3 a detent control member is provided in the form of an arm 19 pivotally supported in the frame H at 20. The upper end 19' of contol arm 19 is positioned to be engaged by the inner end of plunger portion 21 of the outside push button assembly B. As seen in Figure 3 the arm 19 has been moved inwardly (counterclockwise) from the position shown in Figure 4 by inward movement of the push button assembly B. In Figure 3 the push button B has been released by the operator after he has pushed it in to trip or release the latch unit and has been returned by a self-contained spring (not shown) to its normal position. This counterclockwise movement of the arm 19 from the position shown in Figure 4 into that shown in Figure 3 causes corresponding clockwise movement of the detent D against the spring 18 about its pivotal support 15 because of the engagement of the detent engaging face 22 of arm 19 with the cam face 23 of detent D. This movement of detent D causes disengagement of the abutment 16 thereof from the abutment 17 of latch control element 13 and permits the latch unit to move clockwise in unlatching direction.

It will be understood that when the door E is open the latch member L is in door unlatched position as shown in Figure 3. During closing movement of the door the lower leg of the bifurcated portion of the latch member L engages the keeper pin (not shown) on the door fame, causing the latch member L, the shaft 12, and the control element 13 to move in counterclockwise direction from the position shown in Figure 3 until the control element 13 is rotated sufficiently to permit the abutment 16 of detent D to slide into latch holding position relative to the abutment 17 on control element 13, as seen in Figure 4.

A secondary or partially latched position of latch member L is provided by the abutment 17' on element 13. This "secondary latched" position is to be distinguished from the "latched" position of Figure 4 and the "unlatched" position of Figure 3. When the door is not closed with sufficient force to reach its "latched" position as seen in Figure 4, the abutment 16 of detent D may stop in secondary or partially latched position in engagement with the secondary abutment 17' and hold the door in a corresponding secondary latched position.

In addition to the outside push button means for controlling the detent D (and thus effecting release of the latch when the door is closed and latched) I provide an inside push button assembly generally indicated at B' in Figures 1 and 2. This assembly is operatively connected to a remote control shaft 24 which in turn is operatively connected to a pivotally supported pawl member 25 carried by the frame structure H. This pawl, as illustrated, is positioned to engage a projection 26 on detent D whereby, when the push button assembly B' is operated to rotate the shaft 24 in counterclockwise direction as seen in Figure 3 the detent, if in latch holding position, will be moved into latch released position in the same manner as though actuated by pressure on the outside push button B.

The mechanism so far described is substantially the same as that illustrated and claimed in my said copending patent application, Serial No. 746,521, filed May 7, 1947. I will now describe several embodiments of my improved self-acting lock mechanism as incorporated in the tripper type door control apparatus already described.

Referring first to Figures 3 to 9 inclusive, a locking or restraining member 27 is pivotally supported on the edge wall or flange 11 at 28 for movement in a direction substantially parallel to said edge wall 11. A rod 29 is operatively connected to the locking member 27 and extends upwardly therefrom through a grommet 30 in the window moulding 31 and is provided at its upper end with a knob A which facilitates manual operation thereof. The rod 29 and knob A comprise inside manually operable means for positioning the locking member in its various positions which will be later referred to. Locking member 27 is provided with a detent engaging and blocking portion 32 which, under certain conditions which will be explained later, is adapted to be moved with member 27 into and out of position to block the detent D against movement from latch holding position to latch released position. When member 27 is moved into position to so block detent D the latch unit will be locked against movement from door latched to door unlatched position. Accordingly this position of the locking member may be termed its latch locked position.

In order to permit operation of the locking member 27 by the outside key controlled unit A' a link 33 is pivotally secured to the locking member 27 at 34 and extends downwardly and has a pin and slot connection, indicated at 35 in Figures 1 and 3, with a lever 36 which is rotatably mounted on the flange 11 and connected to the key controlled unit A' by an operating shaft 37. This key controlled lock actuating arrangement is also fully described and claimed in my copending U. S. patent application, Serial No. 746,521, filed May 7, 1947 and hence will not be explained in detail here. It will suffice to point out that this apparatus permits independent operation of the lock member 27 either by the inside lock positioning knob A or by the outside key controlled unit A'.

Figure 9:
Figure 9 is a fragmentary view taken on line 9—9 of Figure 8 showing the locking member spring assembly.

A spring 38 is disposed between the locking member 27 and the edge wall 11 of the housing H. One end 39 of spring 38 is bent as seen in Figure 9 and extends through a suitable hole 39' in the edge wall 11 to form a substantially fixed anchor therefor. The effective point of engagement of spring 38 with the frame H is indicated at 39" in Figure 8. The other end 10 of spring 38 is bent in the opposite direction and extends through a suitable hole 41 in the locking member 27. It will be observed from Figures 5 to 9 inclusive that the common center line 42, which extends from the pivotal support 28 of locking member 27 to the effective point of engagement 39" of spring 38 with frame H, remains in substantially the same position regardless of movement of locking member 27 about its pivotal support. The effective point of engagement of the spring 38 with the locking member 27 lies where the end 40 of spring 38 contacts the edge of hole 41. To obtain free action of spring 38 hole 41 is preferably made somewhat larger than the end 40 as is clearly seen in Figures 5–8. This effective point of engagement of spring 38 with locking member 27 moves with the locking member 27 and thus the common center line 43, which extends from said last mentioned effective point of engagement to the center 28 swings about the center 28 with the locking member 27. Spring 38 is preloaded when installed in the apparatus so that the ends 39 and 40 tend at all times to move apart.

Figure 5:
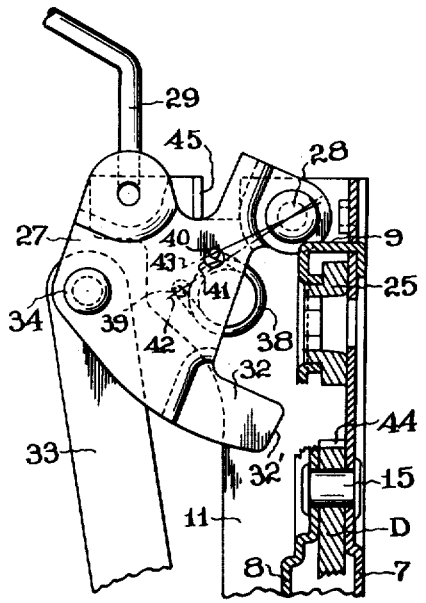
Figure 5 is a detached fragmentary illustrative view taken substantially on line 5—5 of Figure 3 but showing the lock mechanism in latch unlocked position.
Figure 7:
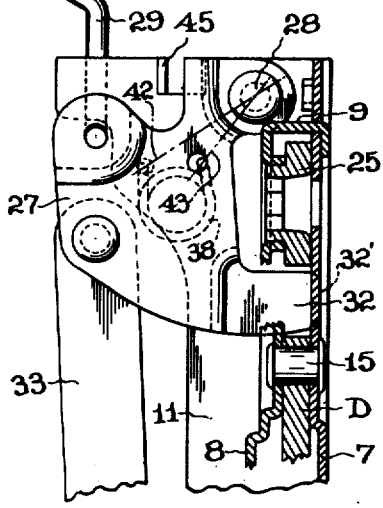
Figure 7 is a view generally similar to Figure 5 but showing the parts in the same positions as in Figure 4, the lock mechanism being in latch locked position and the detent and latch unit being in their door latched positions.
Figure 8:
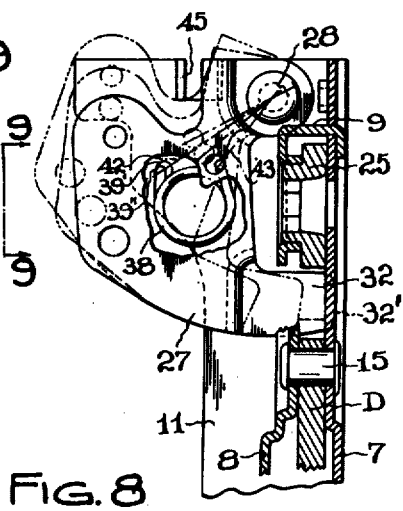
Figure 8 is a combined illustrative view similar to Figure 7 but also indicating in phantom lines the latch unlocked and intermediate positions of the locking member, the locking member being broken away more clearly to show the snap-over spring arrangement.

The operation of the above described self-acting locking means will now be described. When the parts are as shown in Figure 5 the locking member 27 is in its retracted or latch unlocked position, the rod 29 is in its uppermost position and the knob A will also be in its uppermost unlocked position as seen in phantom lines at A" in Figure 3. The detent blocking portion 32 of locking member 27 is fully withdrawn out of the path of movement of detent D and thus the detent D and latch unit are free to have normal unobstructed movement between door latched and door unlatched positions. If the door is closed and the latch unit and detent are in door latched position as seen in Figures 4 and 7 the locking member 27 may be moved about its pivotal support by pushing downwardly on the knob A until the edge face 32' of blocking portion 32 of lock member 27 abuts against the base plate 7 of the frame structure H as seen in Figure 7. This, as noted above, is what is termed the latch locked position of the locking member 27 and it will be seen from Figures 4 and 7 that when in this position the locking portion 32 is disposed directly above the lug 44 on detent D thus preventing movement of the detent from its latch holding position as seen in Figure 4 into latch released position as seen in Figure 3 and effectively locking the entire door control mechanism. The lower or latch locked position of the positioning knob A is indicated in phantom lines at A''' in Figure 3 and it will be seen from the above explanation that when the door is closed and latched and the parts of the door control mechanism are as shown in Figure 4, the locking member 27 may be moved at will from retracted or latch unlocked position as seen in Figure 5 into fully advanced or latch locked position as seen in Figure 7. It may be explained that the cover plate 8 is cut away adjacent the edge wall 11 to permit movement of the blocking portion 32 of locking member 27 between its unlocked and locked positions.

Figure 6:
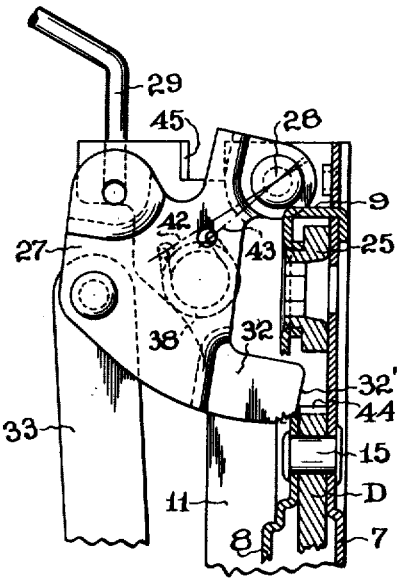
Figure 6 is a view generally similar to Figure 5 but showing the lock mechanism in intermediate or preset position.

When the latch unit and detent D move into either the above mentioned secondary latched position, or into the unlatched position of Figure 3, the lug 44 of detent D is moved upwardly into the path of portion 32 of locking member 27 (see Figures 3, 5 and 6). If the knob A is now moved downwardly from its upper latch unlocked position, as seen at A" in Figure 3, it will swing the locking member 27 about its pivotal support 28 in counterclockwise direction from the latch unlocked position shown in Figure 5 into an intermediate position with the edge face 32' of portion 32 engaging the means for holding or blocking the locking member 27 out of latch locked position. Said means in the illustrated embodiments of my invention comprises the lug 44 on detent D. This intermediate or preset position of the locking member 27 is illustrated in Figure 6, it being noted that the forward edge 32' of portion 32 engages and is blocked from further movement toward locked position by the lug 44 on detent D. It will also be noted that the locking member blocking means (lug 44) is effective to hold the locking member 27 out of latch locked position at all times up to the point when the latch unit substantially reaches its latched position of Figure 4. Thus my present latch, like the latch of my said copending application Serial No. 746,521, cannot be locked when in either unlatched position or secondary latched position. In some door latch mechanisms, such as those illustrated and described in the above referred to Allen and Schonitzer U. S. patent application, Serial No. 760,074, locking is effected by a member which is interposed in the way of the latch unit proper rather than in the way of the detent as in the herein illustrated devices. It will be understood that my self-acting lock may be incorporated in such latch mechanisms or in other door latch mechanisms where the lock member carries out its locking function by coaction with some other element of the structure so long as such element has different door unlatched and door latched positions.

When the locking member 27 is in latch unlocked position as seen in Figure 5 the end 40 of spring 38 is disposed above the common center line 42 of pivot 28 and end 39 of spring 38. In this position the action of spring 38 tends to urge locking member 27 in clockwise direction and holds it in unlocked position in engagement with the stop lug 45 which is bent out from the edge wall 11. Thus when the knob A is in position A" (Figure 3) the locking member 27 is in latch unlocked position and is maintained therein by action of the spring 38. When the knob A is pushed downwardly from position A" into its intermediate position, shown in full lines in Figure 3, the locking member 27 moves in counterclockwise direction into its intermediate or preset position with the end face 32' of portion 32 engaging the lug 44 on detent D (see Figure 6). During this movement of the locking member 27 from latch unlocked to intermediate position the end 40 of spring 38 moves across the common center line 42. When the end 40 of spring 38 reaches a point just below the center line 42 and before member 27 reaches intermediate position, the action of spring 38 is shifted so that it tends to move locking member 27 in counterclockwise direction (Figure 6) toward latch locked position.

From the above description it will be seen that spring 38 is of the "snap-over" type and that when the locking member 27 is moved into its intermediate position, the latch unit being in door unlatched position, spring 38 maintains it in this position and tends to urge it toward latch locked position. As the lug 44 of detent D blocks the locking member 27 out of latch locked position when the latch unit is in door unlatched position no locking action can occur. When the latch unit moves from unlatched position as seen in Figure 3 into latched position as seen in Figure 4 the lug 44 moves out of blocking position and, if the locking member 27 is in its intermediate position, the spring 38 will immediately and automatically move it on into latch locked position as seen in Figure 7. The automatic locking movement of member 27 does not take place until after the parts have moved in latching direction beyond their secondary latched positions and it will be observed that the automatic locking occurs substantially concurrently with movement of the latch unit and detent into heir latched positions which are seen in Figure 4.

The above described arrangement of the snap-over spring mechanism and means for blocking the locking member in an intermediate position provides a self-acting lock whereby, when the vehicle door is open and the latch mechanism is in unlatched position, the operator may move the knob A into its intermediate position (shown in full lines in Figure 3) with concurrent movement of locking member 27 into the intermediate position seen in Figures 3 and 6. If the operator now merely closes the door such closing of the door will move the latch unit from unlatched to latched position as seen in Figure 4 thus permitting spring 18 to move the detent D in counterclockwise direction (Figure 3) to move the lug 44 out of blocking position and permit spring 38 automatically to move the locking member from intermediate into latch locked position as seen in Figure 7.

This self-acting locking mechanism permits the operator to lock the door without using the key by merely presetting the lock in intermediate position when the door is open and then closing the door. To open the door from outside the vehicle after it has been so locked it is necessary to use the key in the key controlled unit A'. However from inside the vehicle the door may be unlocked by merely lifting the button A from its locked position A''' as seen in Figure 3 into its unlocked position A''. The snap-over spring 38 automatically changes the direction in which it urges the locking member 27 at a point between its unlocked position and its intermediate position so that, when the locking member 27 is in latch unlocked position, spring 38 urges the locking member away from its latch locked position and, when the locking member 27 reaches a predetermined point between unlocked and intermediate positions, spring 38 urges the locking member toward its latch locked position.

In some cases mechanical means, other than the spring actuated arrangements herein illustrated and described may be employed for automatically moving the locking member into latch locked position and therefore I do not wish to be limited solely to spring means for effecting the self-acting operation of the lock member.

The manually operable means for moving and positioning the locking member 27, which comprises rod 29 and knob A and/or the outside key controlled unit A' and its associated elements which connect it to member 27, enables the operator to move the locking member of the illustrated apparatus between its unlocked, intermediate and locked positions from either the inner or the outer side of the door. Because of the fact that in the illustrated door control mechanism the latch unit and detent have different positions when the door is closed and latch from the positions they have when the door is open and unlatched I am able effectively to block the locking member 27 against movement into latch locked position whenever the latch mechanism is in door unlatched position. Although in the illustrative embodiments of my invention the locking member 27 is held or blocked in intermediate position by a lug 44 on the detent D it will be understood that locking member blocking means might be associated with a part of the latch unit or other suitable element with the same result. It will also be understood that the outside key controlled locking member positioning means may be omitted if not desired, as in automobile rear door installations, without changing the operation and control of the locking member by the inside positioning means.

Figure 10:
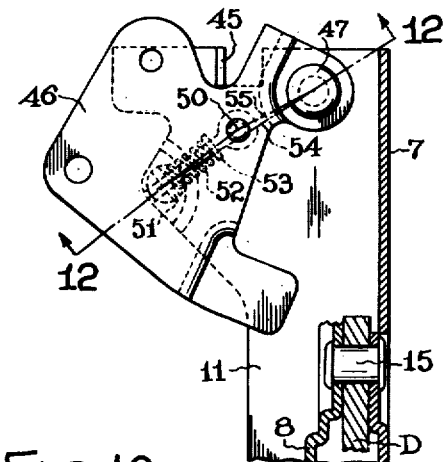
Figure 10 is a fragmentary view generally similar to Figure 5 showing a modified snap-over spring arrangement for providing the self-acting operation of the lock member, the parts being illustrated in latch unlocked position.
Figure 11:
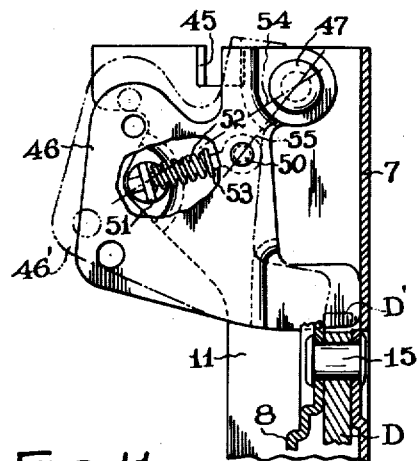
Figure 11 is a view similar to Figure 10 with a part of the locking member broken away more clearly to show the spring arrangement, the locking member being shown in latch locked position.
Figure 12:
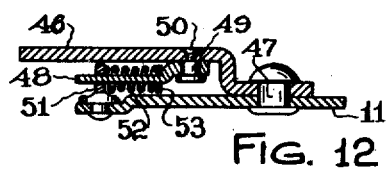
Figure 12 is a fragmentary cross-sectional view taken on line 12—12 of Figure 10.
Figure 15:
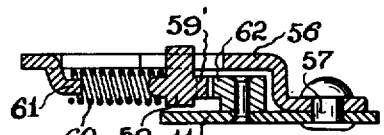
Figure 15 is a cross-sectional view taken on line 15—15 of Figure 14.

Figures 10 to 12 inclusive illustrate a modified arrangement of snap-over spring mechanism for imparting the desired movement and action to the locking member. In this embodiment of my invention the locking member 46 is pivotally supported at 47 on the edge wall 11 and has a spring supporting arm 48 on its inner surface. The arm 48 is pivotally mounted on a pin 49 which may be secured to locking member 46 as by riveting at 50. An inwardly projecting abutment 51 is secured to the edge wall 11 and is provided with a hole in which the spring support arm 48 has guided sliding movement. Spring 52 is disposed on the arm 48 and is installed under initial compression and engages the fixed abutment 51 at one end and a washer 53 at its opposite end. The common center line 54, extending between the pivot 47 of locking member 46 and the fixed abutment 51, is a substantially stationary center line regardless of the position of the locking member 46. However, as the pivot 49 moves with the locking member 46 the center line 55, extending between pivot 47 and pivot 49, moves with the locking member 46 in its travel between latch unlocked position (Figure 10) and latch locked position (Figure 11). The intermediate position of locking member 46 is seen in phantom lines at 46' in Figure 11, the detent D also being shown in its locking member blocking position in phantom lines in Figure 11 at D'. The operating rod 29 and knob A are not shown in Figures 10 and 11 but it will be understood that similar or equivalent manual operating connections will normally be employed.

When the locking member 46 is in unlocked position as seen in Figure 10 the center line 55 is above the center line 54 and the spring 52, being under compression, exerts a force between the stationary abutment 51 and the pivot pin 49 tending to rotate locking member 46 in clockwise direction away from its latch locked position and to hold it in engagement with the stop lug 45. As the locking member 46 is moved toward its latch locked position, as seen in full lines in Figure 11, and before it reaches its intermediate position as seen in phantom lines in Figure 11, the center line 55 across the center line 54 whereupon spring 52 immediately reverses its action and tends to urge locking member 46 toward latch locked position, holding it in intermediate position against lug 44 on detent D if this lug is in blocking position and until it is withdrawn out of blocking position upon closing of the door and movement of the latch mechanism into door latched position. When this occurs the spring 52 will automatically move the locking unit 46 from intermediate position into locked position as seen in Figure 11. Thus substantially the same results are obtained with the embodiment illustrated in the Figures 10–12 as with the snap-over spring arrangement illustrated in Figures 3–9. It will also be noted that in Figures 10, 11, 13 and 14 the pawl 25 and the upper portion of the housing H have been omitted in order more clearly to illustrate the elements of my self-acting lock mechanism.

Figure 16:
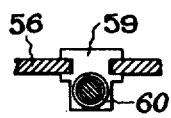
Figure 16 is a fragmentary cross-sectional view taken on line 16—16 of Figure 13.

Another embodiment of my automatic spring actuated means for causing self-acting movement of a pivotally supported locking member is shown in Figures 13–16 wherein a locking member 56 has a pivotal support at 57 on the edge wall 11. This locking member is similar in general form and function to the locking members previously described but is provided with a slot 58 in which a grooved cam follower 59 is slidably mounted as best seen in Figure 16. A compression spring 60 abuts at one end against the cam follower 59 and is supported on a pin 61 carried by the locking member 56 as its opposed end. Secured to the edge wall 11 and disposed between the inner face thereof and the inner face of locking member 56 is a cam member 62 having a rounded point portion 63. This cam 62 is aligned with the pointed end 59' of cam follower 59 and spring 60, being under compression at all times, urges the point 59' against the face of cam 62.

Figure 13:
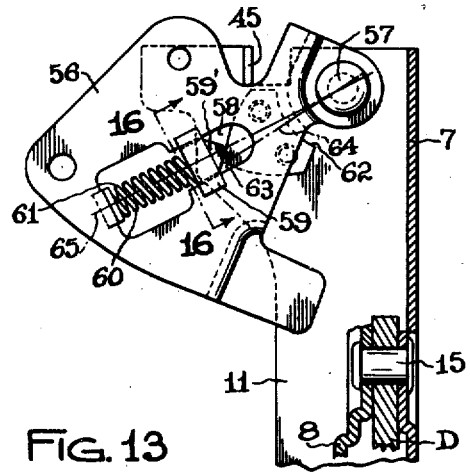
Figure 13 is a view generally similar to Figures 5 and 10 but illustrating another modification of my invention in which a cam device is employed for providing the self-acting operation of the locking member.
Figure 14:
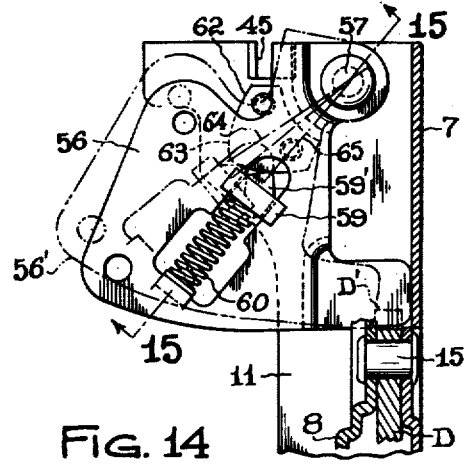
Figure 14 is a view similar to Figure 13 but illustrating the locking member in latch locked position.

As is seen in Figure 13, when locking member 56 is in unlocked position the cam follower 59 engages the cam 62 on the upper side of the point 63 thereof and action of the spring 60, through the follower 59, against the cam 62 tends to move locking member 56 in clockwise direction away from latch locked position and to hold it against the stop lug 45 in the manner explained previously in referring to the other embodiments of my invention.

The common fixed center line 64 extends between the pivot point 57 and the point 63 of cam 62. When the locking member is in latch unlocked position as seen in Figure 13 the center line 65, extending from pivot 57 through the point 59' of cam follower 59, lies above the center line 64. When locking member 56 is moved from its unlocked position of Figure 13 toward its intermediate position, shown in phantom lines at 56' in Figure 14, and before reaching said intermediate position, the point 59' passes over the point 63 of cam 62 thus changing the action of spring 60 so that it tends to move locking member 56 toward its latch locked position and to hold it in intermediate position provided the latch mechanism is in door unlatched position. Upon movement of the latch mechanism from door unlatched position into door latched position the detent D will be moved out of blocking position, as seen in phantom lines at D' in Figure 14, permitting the spring and cam arrangement just described automatically to move the locking member 56 from intermediate into locked position.

In some forms of door control mechanisms it may be desirable to employ a sliding locking member as distinguished from a pivotally supported locking member. An arrangement of this type incorporating my self-acting features is illustrated in Figures 17 to 20 inclusive. The details of the latch mechanism per se are not shown in these figures except for the detent and its supporting members. The frame structure of this apparatus includes a base plate 7', a cover plate 8' and an edge wall 11'. The base plate 7' is mounted against the free or rear edge wall 3' of the door structure as previously described and a generally channel shaped locking member guide 66 is secured to edge wall 11' as by bent over tangs 67 (see Figure 20). Slidably supported for lineal movement in the channel 66 is a locking member 68. The upper edge of channel 66 is slotted at 69 to accommodate the locking member operating lever 70, the lower end 71 of which extends through slot 69 into a vertical slot 72 in locking member 68. Lever 70 is pivotally mounted on the edge wall 11' at 73 and it will be seen that rotation of the lever 70 about its pivotal support will cause corresponding sliding movement of the locking member 68 in its guide channel 66. The upper end of lever 70 above the pivot 73 is provided with an angle extension 74 having a manual control knob 75 at its outer end. Extension 74 projects through a suitable slot 76 in an inner panel 2 of the door and the knob is located so that it may conveniently be moved by hand. The upper end of a tension spring 77 is attached to a pin 78 which extends from the upper end of lever 70 and may conveniently be arranged directly opposite the angle extension 74. The lower end of this spring 77 is secured to a lug 79 on the inner edge wall 11'.

Figure 17:
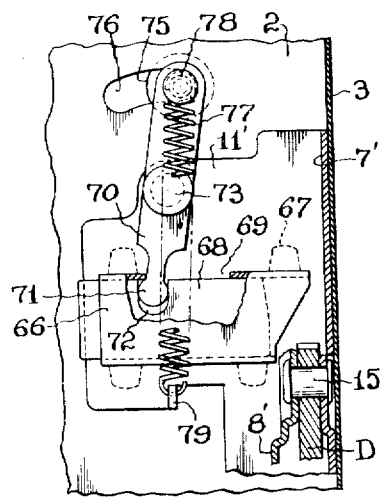
Figure 17 is a view generally similar to Figures 5, 10 and 13 but illustrating another modification of my self-acting locking means in which the locking member is supported for sliding movement and is combined with an actuating lever, the locking means being shown in retracted or latch unlocked position.
Figure 18:
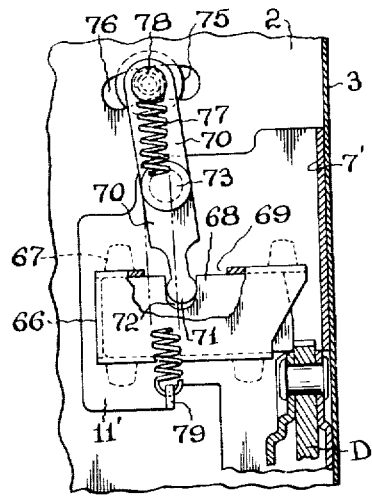
Figure 18 is a view similar to Figure 17 but showing the locking member in intermediate position.
Figure 19:
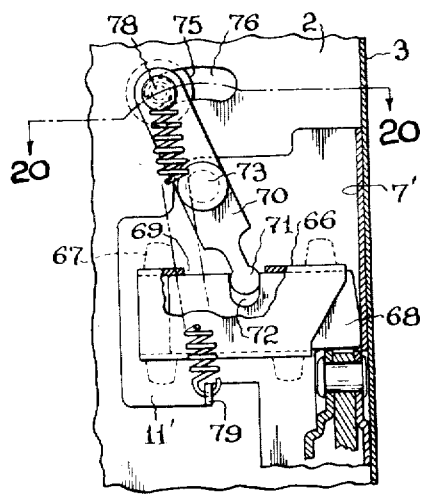
Figure 19 is a view similar to Figures 17 and 18 but showing the locking member in latch locked position, the detent being in its latch holding position.
Figure 20:
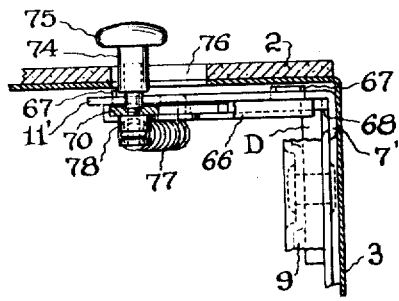
Figure 20 is a horizontal cross-sectional view taken substantially on line 20—20 of Figure 19 illustrating a manually operable means for positioning the locking member in its various positions.

The above described arrangement provides a snap-over spring assembly whereby, when the locking member 68 is in latch unlocked position as seen in Figure 17, the spring 77 tends to rotate lever 70 in clockwise direction and to move locking member 68 away from latch locked position. Movement of lever 70 in clockwise direction is limited by its engagement with the end of slot 69 as seen in Figure 17. If the door control mechanism is in door unlatched position, with the detent D in the position shown in Figures 17 and 18, movement of the lever 70 by means of knob 75 in counterclockwise direction from the position shown in Figure 17 will cause the locking member 68 to move into intermediate position in blocked engagement with the detent D as seen in Figure 18. During this movement, and before the locking member 68 reaches intermediate position, the center line of spring 77 will pass from the right-hand side of the pivot point 73 as seen in Figure 17 to the left-hand side of pivot point 73 as seen in Figure 18. When the center line of the spring passes over this pivot point 73 its action on the lever 70 will be reversed and it will tend to move same in counterclockwise direction and to urge the locking member 68 toward latch locked position. With the parts in the positions shown in Figure 18, if the latch mechanism is moved into door latched position, as by closing the door, the spring 70 will automatically and immediately move the locking member 68 into latch locked position as seen in Figure 19 as soon as the detent D moves out of its blocking position relative to the locking member 68. With the arrangement just described the positioning of the locking member 68 in its latch unlocked, intermediate, and latch locked positions is controlled by swinging movement of an inside controlled knob 75 rather than by vertical movement thereof as in the previously described embodiments.

Although I have illustrated and described in considerable detail several embodiments of my improved self-acting lock apparatus for door control mechanisms it will be understood by those skilled in the art that variations and modifications may be made in the arrangement, form, and proportions of the elements employed to achieve my new and useful results, and that my improved locking mechanism may readily be adapted for use with door control mechanisms other than those specifically described or referred to herein, without departing from the spirit of my invention. I do not therefore wish to be limited to the particular devices herein shown and described but claim as my invention all embodiments thereof coming within the scope of the appended claims.

I claim:

1. In a door control mechanism, a movable latch unit supported for movement between a door latched position and a door unlatched position, spring means for urging said latch unit at all times toward said door unlatched position, a movable detent adapted releasably to maintain said latch unit in door latched position and having a latch released position and a latch holding position, locking means for preventing release of said latch unit for movement by said spring means from door latched position to door unlatched position, said locking means having a latch unlocked position and a latch locked position, means effective when said latch unit is out of door latched position for holding said locking means out of latch locked position in an intermediate position, and means, effective when said locking means is in said intermediate position, for moving said locking means from said intermediate position into said locked position upon movement of said latch unit into door latched position.

2. In a door control mechanism, a latch unit supported for movement between a door latched position and a door unlatched position, a movable detent adapted releasably to maintain said latch unit in door latched position and having a latch released position and a latch holding position, means for actuating said detent to release said latch unit from door latched position, locking means for preventing release of said latch unit from door latched position, manually operable means for selectively moving said locking means into and out of a locked position in which release of said latch unit from door latched position is prevented, means for engaging and blocking said locking means against movement into locked position when said latch unit is in door unlatched position, said blocking means being rendered ineffective upon movement of said latch unit from door unlatched to door latched position, and means, effective when said locking mans is engaged and blocked by said blocking means, for automatically moving said locking means into locked position upon movement of said latch unit into door latched position.

3. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, and a latch locked position, and an intermediate position therebetween, blocking means effective when said latch unit is out of door latched position for holding said locking member against movement from said intermediate position into said latch locked position, and means for automatically moving said locking member from said intermediate position into said latch locked position upon movement of said latch unit into door latched position.

4. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, a latch locked position, and an intermediate position therebetween, blocking means effective when said latch unit is out of door latched position for holding said locking member against movement from said intermediate position into said latch locked position, means for automatically moving said locking member from said intermediate position into said latch locked position upon movement of said latch unit into door latched position, and manually operable means for positioning said locking member in either latch unlocked, latch locked, or intermediate position.

5. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, and a latch locked position, and an intermediate position therebetween, blocking means effective when said latch unit is out of door latched position for holding said locking member against movement from said intermediate position into said latch locked position, and spring means operatively associated with said locking member and adapted to urge said locking member away from said latch locked position when said locking member is in said latch unlocked position and to urge said locking member toward said latch locked position upon said locking member reaching a point between said latch unlocked position and said intermediate position during movement from latch unlocked position toward latch locked position.

6. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, and a latch locked position, and an intermediate position therebetween, blocking means effective when said latch unit is out of door latched position for holding said locking member against movement from said intermediate position into said latch locked position, spring means operatively associated with said locking member and adapted to urge said locking member away from said latch locked position when said locking member is in said latch unlocked position and to urge said locking member toward said latch locked position upon said locking member reaching a point between said latch unlocked position and said intermediate position during movement from latch unlocked position toward latch locked position, and manually operable means for moving said locking member from said latch unlocked position to said intermediate and latch locked positions and return.

7. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, and a latch locked position, and an intermediate position therebetween, blocking means effective when said latch unit is out of door latched position for holding said locking member against movement from said intermediate position into said latch locked position, spring means operatively associated with said locking member and adapted to urge said locking member away from said latch locked position when said locking member is in said latch unlocked position and to urge said locking member toward said latch locked position upon said locking member reaching a point between said latch unlocked position and said intermediate position during movement from latch unlocked position toward latch locked position, and means, manually operable from the inner side of the door with which the mechanism is used, for moving said locking member from said latch unlocked to said intermediate and latch locked positions and return.

8. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, a latch locked position, and an intermediate position therebetween, blocking means effective when said latch unit is out of door latched position for holding said locking member against movement from said intermediate position into said latch locked position, and means, including a snap-over spring, for holding said locking member in said intermediate position after being moved thereinto when said latch unit is in door unlatched position and for automatically moving said locking member from said intermediate position into said latch locked position when said latch unit moves from door unlatched into door latched position.

9. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable locking member having a latch unlocked position, a latch locked position, and an intermediate position therebetween, blocking means effective when said latch unit is out of door latched position for holding said locking member against movement from said intermediate position into said latch locked position, means, including a snap-over spring, for holding said locking member in said intermediate position after being moved thereinto when said latch unit is in door unlatched position and for automatically moving said locking member from said intermediate position into said latch locked position when said latch unit moves from door unlatched into door latched position, and manually operable means for positioning said locking member in either latch unlocked, latch locked, or intermediate position.

10. In a door control mechanism, a movable latch unit; a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a locking member having a latch unlocked position, a latch locked position, and an intermediate position therebetween, locking member blocking means arranged to be moved from blocking to non-blocking position concurrently with movement of said latch unit from door unlatched to door latched position whereby said blocking means is effective to hold said locking member against movement from said intermediate position into said latch locked position when said latch unit is out of door latched position, and spring means for urging said locking member from said intermediate position into said locked position whereby, when said latch unit is in door unlatched position and said locking member is moved from said unlocked position into said intermediate position, movement of said latch unit into door latched position and concurrent movement of said blocking means into non-blocking position will permit said spring means to move said locking member from said intermediate position into said locked position.

11. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a locking member having a latch unlocked position, a latch locked position, and an intermediate position therebetween, locking member blocking means arranged to be moved from blocking to non-blocking position concurrently with movement of said latch unit from door unlatched to door latched position whereby said blocking means is effective to hold said locking member against movement from said intermediate position into said latch locking position when said latch unit is out of door latched position, spring means for urging said locking means from said intermediate position into said locked position whereby, when said latch unit is in door unlatched position and said locking member is moved from said latch unlocked into said intermediate position, movement of said latch unit into door latched position and concurrent movement of said blocking means into non-blocking position will permit said spring means to move said locking member from said intermediate position into said locked position, and manually operable means for positioning said locking member in either unlocked, locked, or intermediate position.

12. In a door control mechanism, a movable latch unit, a movable detent operatively associated with said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a locking member having a latch unlocked position, a latch locked position, and an intermediate position therebetween, blocking means for holding said locking member against movement from said intermediate position into said latch locking position when said latch unit is in its operated or door unlatched position, said blocking means being operatively associated with said detent for movement out of position to hold said locking member in its intermediate position concurrently with movement of said detent into latch holding position, and means for urging said locking member away from said latch locked position when said locking member is in said latch unlocked position and toward said latch locked position when in said intermediate position.

13. In combination in a door control mechanism, a latch unit supported for movement between a door latched position and a door unlatched position, a movable detent adapted releasably to maintain said latch unit in door latched position and having a latch released position and a latch holding position, a locking member supported for movement between a latch unlocked position and a latch locked position and having an intermediate position therebetween, lock member blocking means associated with said detent, said locking member having a portion positioned to engage said lock member blocking means when said detent is in latch released position whereby said locking member is held out of latch locked position in said intermediate position, and spring means for urging said locking member away from said latch locked position when in said latch unlocked position and toward said latch locked position when in said intermediate position whereby said locking member, after being moved from said latch unlocked position to said intermediate position, will be moved by said spring means into its latch locked position upon movement of said detent into latch holding position.

14. In a door control mechanism, a frame structure, a latch unit supported by said frame structure for movement between a door latch position and a door unlatched position, a movable detent supported by said frame structure and operatively associated with said latch unit, said detent having a latch holding position and a latch released position, a locking member pivotally supported on said frame structure for movement between a latch unlocked position and a latch locked position, locking member blocking means effective when said latch unit is out of door latched position to block said locking member out of latch locked position in an intermediate position, and spring means extending between said frame and said locking member, the common center line between the pivotal support of said locking member and the effective point of engagement of said spring means with said frame structure passing between the position of the effective point of engagement of said spring means with said locking member when said locking member is in unlocked position and the position of said effective point of engagement of said spring means with said locking member when said locking member is in said intermediate position, whereby when said locking member is in unlocked position said spring means tends to maintain it therein and, when said locking member is moved from unlocked position toward locked position, said spring means will, after said effective point of engagement of said spring means with said locking member crosses said common center line, urge said locking member toward its said intermediate and latch locked positions.

15. In a door control mechanism, a frame structure, a latch unit supported by said frame structure for movement between a door latched position and a door unlatched position, a movable detent supported by said frame structure and operatively associated with said latch unit, said detent having a latch holding position and a latch released position, a locking member pivotally supported on said frame structure for movement between a latch unlocked and a latch locked position, said detent having a locking member blocking portion movable therewith, said blocking portion being positioned to block said locking member out of latch locked position in an intermediate position when said detent is in latch released position and to permit movement of said locking member into latch locked position when said detent is in latch holding position, and spring means extending between said frame and said locking member, the common center line between the pivotal support of said locking member and the effective point of engagement of said spring means with said frame structure passing between the position of the effective point of engagement of said spring means with said locking member when said locking member is in unlocked position and the position of said effective point of engagement of said spring means with said locking member when said locking member is in said intermediate position, whereby when said locking member is in unlocked position said spring means tends to maintain it therein and, when said locking member is moved from unlocked position toward locked position, said spring means will, after said effective point of engagement of said spring means with said locking member crosses said common center line, urge said locking member toward its said intermediate and latch locked positions.

16. In a door control mechanism, a frame structure, a latch unit supported by said frame structure for movement between a door latched position and a door unlatched position, a movable detent supported by said frame structure and operatively associated with said latch unit, said detent having a latch holding position and a latch released position, a locking member pivotally supported on said frame structure for movement between a latch unlocked position and a latch locked position, locking member blocking means effective when said latch unit is out of door latched position to block said locking member out of latch locked position in an intermediate position, coacting cam and follower members one carried by said frame and the other by said locking member, spring means for maintaining said follower in spring pressed engagement with said cam, the contour of said cam being such that the pressure of said follower thereagainst tends, when said locking member is in unlocked position, to maintain it therein and, when said locking member is moved from unlocked position toward locked position and reaches a predetermined position between said unlocked position and said intermediate position, pressure of said follower against said cam will move said locking member toward said intermediate position.

17. In a door control mechanism, a frame structure, a latch unit supported by said frame structure for movement between a door latched position and a door unlatched position, a movable detent supported by said frame structure and operatively associated with said latch unit, said detent having latch holding position and a latch released position, a locking member supported on said frame structure for lineal movement between a latch unlocked position and a latch locked position, locking member blocking means effective when said latch unit is out of door latched position to block said locking member out of latch locked position in an intermediate position, an actuating lever for said locking member, said lever being pivotally mounted on said frame, means for operatively connecting said lever to said locking member, and spring means extending between said lever and said frame, said spring means being arranged to urge said lever in a direction to move said locking member away from said intermediate and locked positions when said locking member is in unlocked position and to urge said lever in a direction to move said locking member toward said intermediate and locked positions upon said locking member reaching a point between said unlocked position and said intermediate position during movement from unlocked position toward locked position.

18. In a door control mechanism, a frame structure, a latch unit supported by said frame structure for movement between a door latched position and a door unlatched position, a movable detent supported by said frame structure and operatively associated with said latch unit, said detent having a latch holding position and a latch released position, a locking member supported on said frame structure for lineal movement between a latch unlocked position and a latch locked position, locking member blocking means effective when said latch unit is out of door latched position to block said locking member out of latch locked position in an intermediate position, an actuating lever for said locking member, said lever being pivotally mounted on said frame, means for operatively connecting said lever to said locking member, spring means extending between said lever and said frame, said spring means being arranged to urge said lever in a direction to move said locking member away from said intermediate and locked positions when said locking member is in unlocked position and to urge said lever in a direction to move said locking member toward said intermediate and locked positions upon said locking member reaching a point between said unlocked position and said intermediate position during movement from unlocked position toward locked position, and means for manually moving said actuating lever to selectively position said locking member in said latch locked, latch unlocked, or intermediate positions.

19. Apparatus for locking a door latch mechanism, having a door latched position and a door unlatched position, against release from door latched position comprising, releasable means for non-yieldingly maintaining the latch mechanism in said latched position, a locking member supported for movement between a locked position and an unlocked position, said locking member when in unlocked position permitting release of said door latch mechanism from non-yielding door latched position and when in locked position preventing release of said door latch mechanism from said door latched position, manually operable means for selectively positioning said locking member in either of said two positions, means for holding said locking member out of locked position when said latch mechanism is in door unlatched position, and means, effective when said locking member is held out of locked position, for automatically moving said locking member into locked position upon movement of said latch mechanism into door latched position.

20. In a door control mechanism, a latch unit supported for movement between a door latched position, a secondary latched position, and a door unlatched position, means for releasably holding said latch unit in door latched position, means for releasably holding said latch unit in said secondary latched position, locking means for preventing release of said latch unit from door latched position, said locking means having a latch unlocked position and a latch locked position, means effective when said latch unit is in said secondary latched position or in said door unlatched position for holding said locking means out of latch locked position in an intermediate position, and means, effective when said locking means is in said intermediate position, for moving said locking means from said intermediate position into said locked position upon movement of said latch unit into door latched position.

21. In a door control mechanism, a latch unit supported for movement between a door latched position and a door unlatched position, a positive detent adapted releasably to hold said latch unit in door latched position, said detent having a latch holding position in which said latch unit is positively blocked against unlatching movement and also a latch released position, means for actuating said detent to release said latch unit from door latched position, locking means for preventing release of said latch unit from door latched position, means for automatically moving said locking means into locked position upon movement of said latch unit into door latched position, and manually operable control means for selectively rendering said automatic means effective or ineffective to move said locking means into locked position upon movement of said latch unit into door latched position.

EDWIN L. ALLEN.

REFERENCES CITED

The following references are of record in the file of this patent:

UNITED STATES PATENTS

| Number | Name | Date |
| --- | --- | --- |
| 2,344,532 | Brantingson | Mar. 21, 1944 |